United States Patent
Kamegaya et al.

(10) Patent No.: US 7,150,928 B2
(45) Date of Patent: Dec. 19, 2006

(54) FUEL CELL DRIVE SYSTEM

(75) Inventors: Shigeru Kamegaya, Tokyo (JP);
Tadashi Matoba, Yokosuka (JP);
Mitsutaka Abe, Yokosuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 582 days.

(21) Appl. No.: 10/089,567

(22) PCT Filed: Sep. 10, 2001

(86) PCT No.: PCT/JP01/07836

§ 371 (c)(1),
(2), (4) Date: Apr. 2, 2002

(87) PCT Pub. No.: WO02/23659

PCT Pub. Date: Mar. 21, 2002

(65) Prior Publication Data

US 2002/0155331 A1 Oct. 24, 2002

(30) Foreign Application Priority Data

Sep. 12, 2000 (JP) ............................. 2000-276342
Nov. 10, 2000 (JP) ............................. 2000-343569

(51) Int. Cl.
*H01M 8/06* (2006.01)
(52) U.S. Cl. .............................. 429/17; 429/19; 429/20; 429/26
(58) Field of Classification Search ................ 429/19, 429/20, 26
See application file for complete search history.

(56) References Cited

U.S. PATENT DOCUMENTS 4,473,622 A 9/1984 Chludzinski et al.
6,472,092 B1 * 10/2002 Matsuda et al. .............. 429/17

FOREIGN PATENT DOCUMENTS

| DE | 197 27 588 | | 2/1999 |
| EP | 1 047 144 | | 10/2000 |
| JP | 2000-063101 A | | 2/2000 |
| JP | 2000-63104 | * | 2/2000 |

OTHER PUBLICATIONS

Patent Abstracts of Japan, vol. 2000, No. 05, Sep. 14, 2000. Japanese Patent No. 2000-063104, issued Feb. 29, 2000.
Patent Abstracts of Japan, vol. 1995, No. 11, Dec. 26, 1995. Japanese Patent No. 07-215702, issued Aug. 15, 1995.
Patent Abstracts of Japan, vol. 2000, No. 24, May 11, 2001. Japanese Patent No. 2001-180908, issued Jul. 3, 2001.
Patent Abstracts of Japan, vol. 1997, No. 06, Jun. 30, 1997. Japanese Patent No. 09-035734, issued Feb. 7, 1997.

* cited by examiner

Primary Examiner—Jonathan Crepeau
(74) Attorney, Agent, or Firm—Foley & Lardner LLP

(57) ABSTRACT

When a system starts, a fuel-air mixture (rich air-fuel ratio) of fuel and air supplied to a start-up combustor (20) is ignited by a glow plug (40), and high temperature gas containing fuel components for a reforming reaction are generated. The high temperature gas containing fuel components for the reforming reaction is supplied to a reformer (22).

9 Claims, 15 Drawing Sheets

HIGH TEMPERATURE GAS FLOW

US 7,150,928 B2

FUEL CELL DRIVE SYSTEM

FIELD OF THE INVENTION

This invention relates to a fuel cell drive system which supplies reformate gas containing hydrogen, to a fuel cell.

BACKGROUND OF THE INVENTION

JP-A-H7-215702 published by the Japanese Patent Office in 1995 discloses a fuel cell drive system which, in order to improve hydrogen yield and suppress production of soot, supplies a fuel-air mixture having a stoichiometric air-fuel ratio on startup, ignites it by a glow plug, heats a reformate catalyst and fuel gas by the heat of combustion, generates CO (carbon monoxide) by a partial oxidation reaction with a reformate catalyst, and performs a shift reaction to hydrogen using water vapor.

SUMMARY OF THE INVENTION

However, in the above-mentioned technique, fuel is completely burnt in the vicinity of the stoichiometric air-fuel ratio, so the combustion temperature increases and NOx is produced. Further, the catalyst temperature rises due to the burnt gas, and after this has warmed up, supply of fuel and ignition by the glow plug are repeated, so the composition of the reformate gas does not easily stabilize and control is complex.

It is therefore an object of this invention to obtain a stable reformate gas composition when the fuel cell drive system starts up. It is a further object of this invention to shorten the startup time of a fuel cell and reformer, suppress discharge of NOx, and improve heat withstand performance.

In order to achieve above object, this invention provides a drive system for a fuel cell, comprising a reformer which generates reformate gas containing hydrogen by reforming a fuel gas and supplies the reformate gas to the fuel cell, and a gas supply device provided upstream of the reformer which supplies a mixture of fuel gas and air to the reformer when the system is in a normal running state. The gas supply device generates a high temperature gas heated by combustion containing a fuel component for a reforming reaction and supplies the high temperature gas containing the fuel component for the reforming reaction to the reformer when the system starts up.

The details as well as other features and advantages of this invention are set forth in the remainder of the specification and are shown in the accompanying drawings.

DESCRIPTION OF THE PREFERRED EMBODIMENTS

Figure 1:
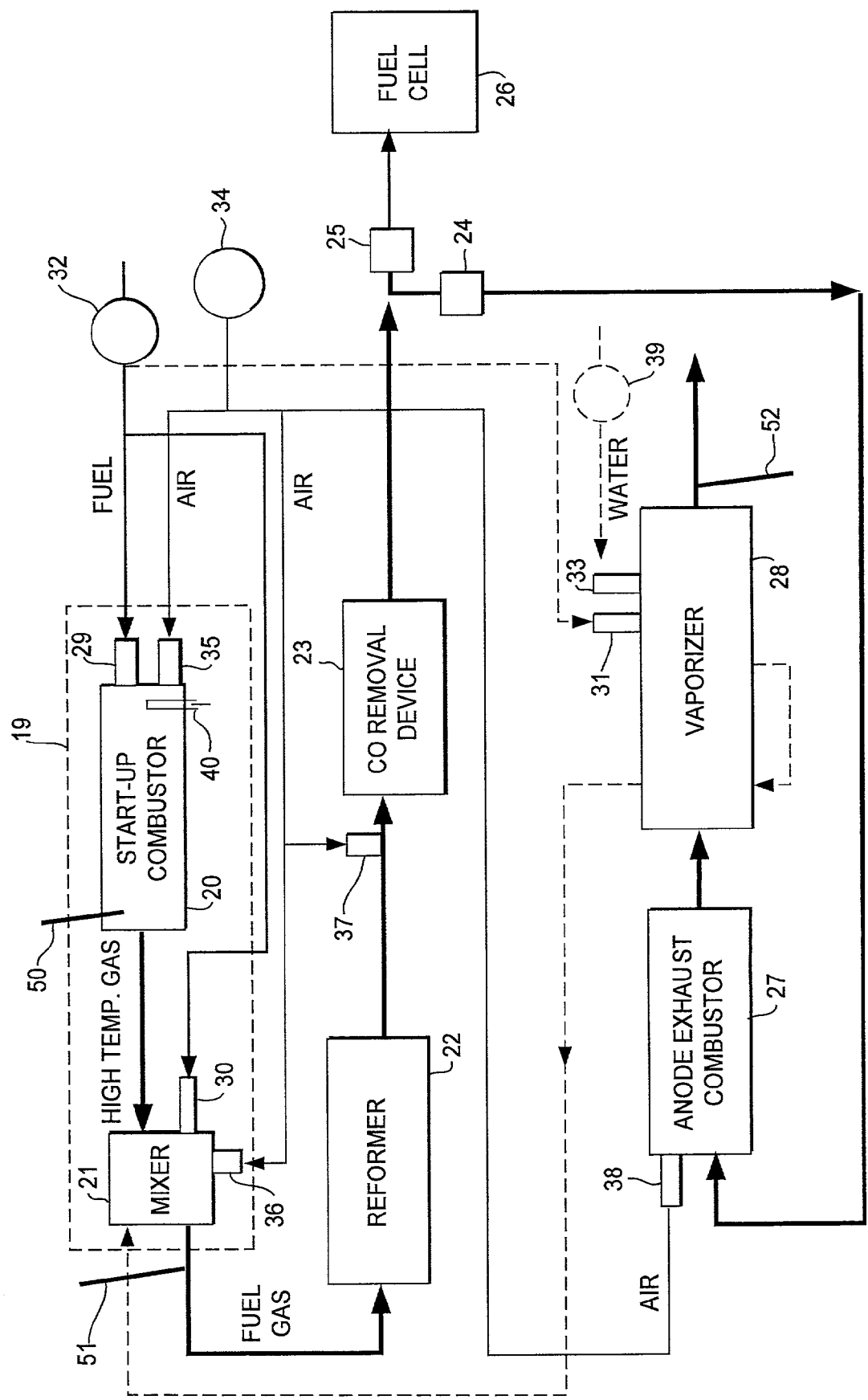
FIG. 1 is a block diagram of a fuel cell drive system according to this invention showing a startup running state.
Figure 2:
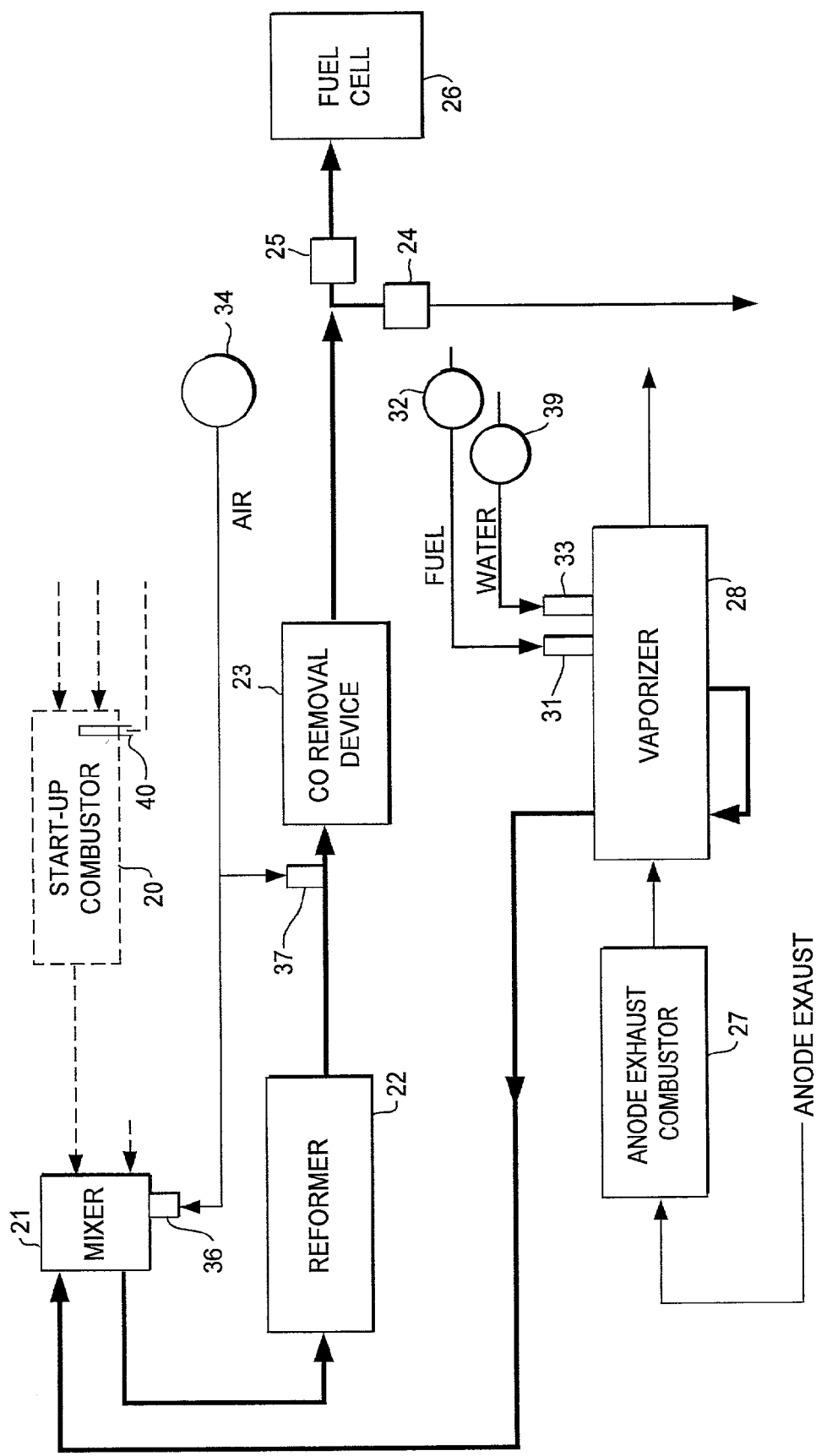
FIG. 2 is similar to FIG. 1, but showing a normal running state.

Referring to FIG. 1, FIG. 2 of the drawings, a fuel cell drive system comprises a gas supply device 19, reformer 22, CO removal device 23, anode exhaust combustor 27, vaporizer 28, fuel pump 32, compressor 34 and water pump 39. FIG. 1 shows the state of the system during startup running, and FIG. 2 shows the state during normal running after the system start up has been completed.

The gas supply device 19 comprises a start-up combustor 20 and mixer 21. The start-up combustor 20 burns fuel and generates high temperature gas when the system starts up. The mixer 21 mixes the high temperature gas generated by the startup combustor 20 with fuel and air required to start the reformer 22, and vaporizes fuel. In this embodiment, methanol is supplied as fuel to the mixer 21, but other liquid fuels containing hydrocarbon components, such as gasoline, may also be supplied.

Fuel is supplied by a fuel injector 29 (first fuel supply mechanism) to the start-up combustor 20. Air compressed by the compressor 34 is also supplied to the start-up combustor 20 by an air nozzle 35. A glow plug 40 is also inserted into the start-up combustor 20 to ignite the fuel. Fuel and air are also supplied to the mixer 21 from a fuel injector 30 (second fuel supply mechanism) and an air nozzle 36 (first air supply mechanism) to adjust the gas composition.

The reformer 22 reforms fuel, and generates reformate gas containing hydrogen. The CO removal device 23 decreases CO (carbon monoxide) in the reformate gas produced by the reformer 22 to the concentration permitted by the fuel cell 26 by using a CO removal catalyst.

A change-over valve 24 which supplies the total amount of reformate gas produced during reformer startup to the anode exhaust combustor 27, and a change-over valve 25 which shuts off the inflow of reformate gas to the fuel cell 26, are provided downstream of the CO removal device 23.

During startup running, the anode exhaust combustor 27 catalytically burns reformate gas supplied from the reformer 22 via the CO removal device 23, and during normal running, catalytically burns hydrogen containing anode exhaust and oxygen containing cathode exhaust from the fuel cell 26, and generates high temperature burnt gas. Subsequently, this burnt gas is introduced to the downstream vaporizer 28, and after the temperature of the vaporizer 28 has risen, it is discharged to the outside.

Air required in the CO removal device 23 and anode exhaust combustor 27 is respectively supplied from an air nozzle 37 (second air supply mechanism) and air nozzle 38. Fuel is pressurized to a predetermined pressure via the fuel pump 32 and a pressure adjusting device, not shown, and is supplied to the start-up combustor 20.

In the normal running state (FIG. 2), the change-over valve 24 is closed, the change-over valve 25 is opened, and all the reformate gas from the CO removal device 23 is sent to the fuel cell 26. The remaining reformate gas which was not used for power generation in the fuel cell 26 is supplied to the anode exhaust combustor 27. The remaining reformate gas becomes high temperature burnt gas due to the catalytic combustion, enters the vaporizer 28 and raises its temperature. At this time, fuel and water are respectively supplied to the vaporizer 28 from supply valves 31, 33, are vaporized in the vaporizer 28 by heat exchange, and flow into the mixer 21.

The vaporized gas is mixed with air supplied from the air nozzle 36 in order to achieve the required composition for reforming, and is sent to the reformer 22. At this time, fuel supply to the start-up combustor 20 and mixer 21 is stopped.

Figure 3:
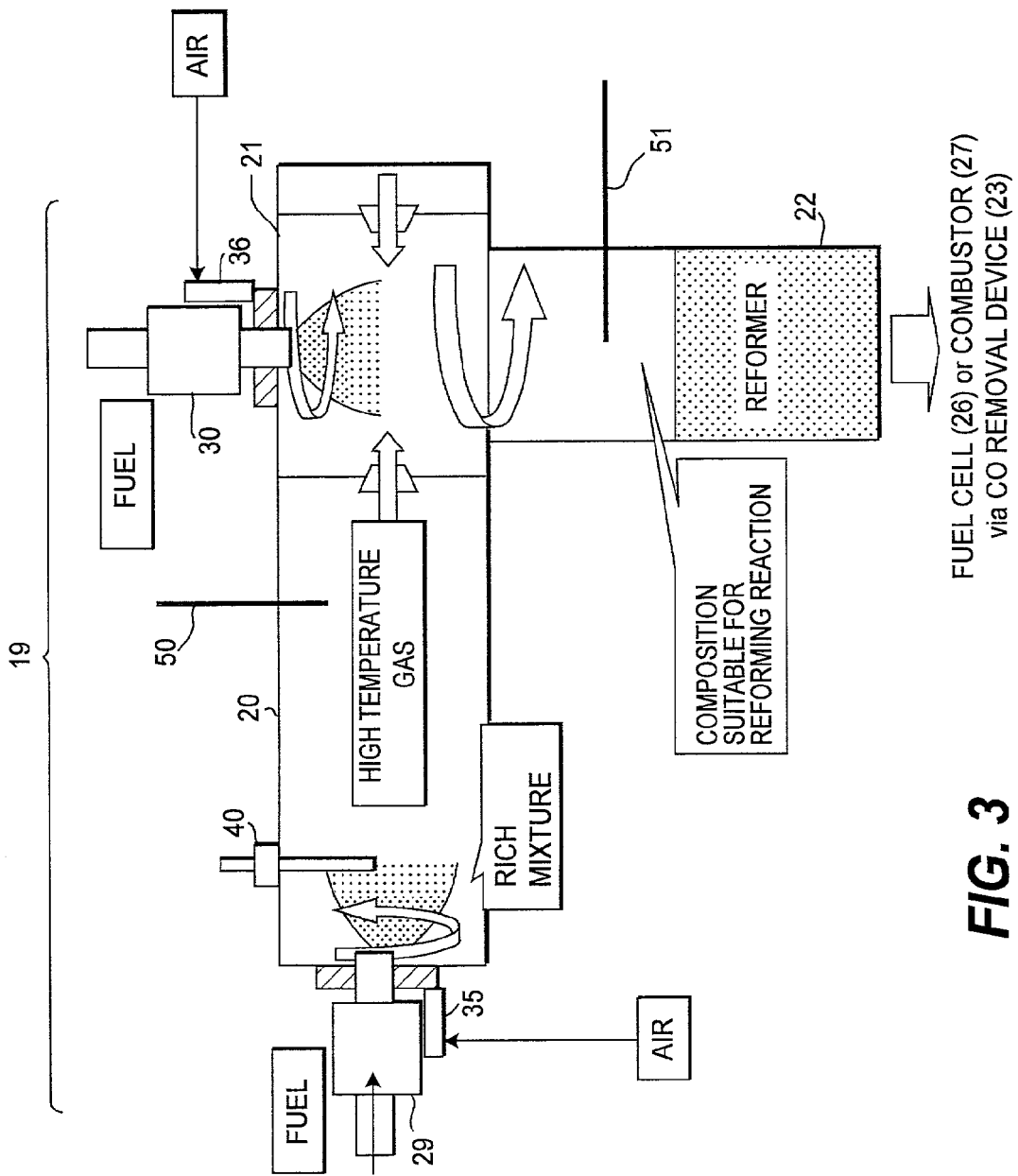
FIG. 3 is a schematic view of a gas supply device.

Next, the startup process of the system will be described referring to FIG. 1, FIG. 3 and FIG. 4. FIG. 3 shows the specific composition of the gas supply device 19 and FIG. 4 shows the startup process.

Figure 4:
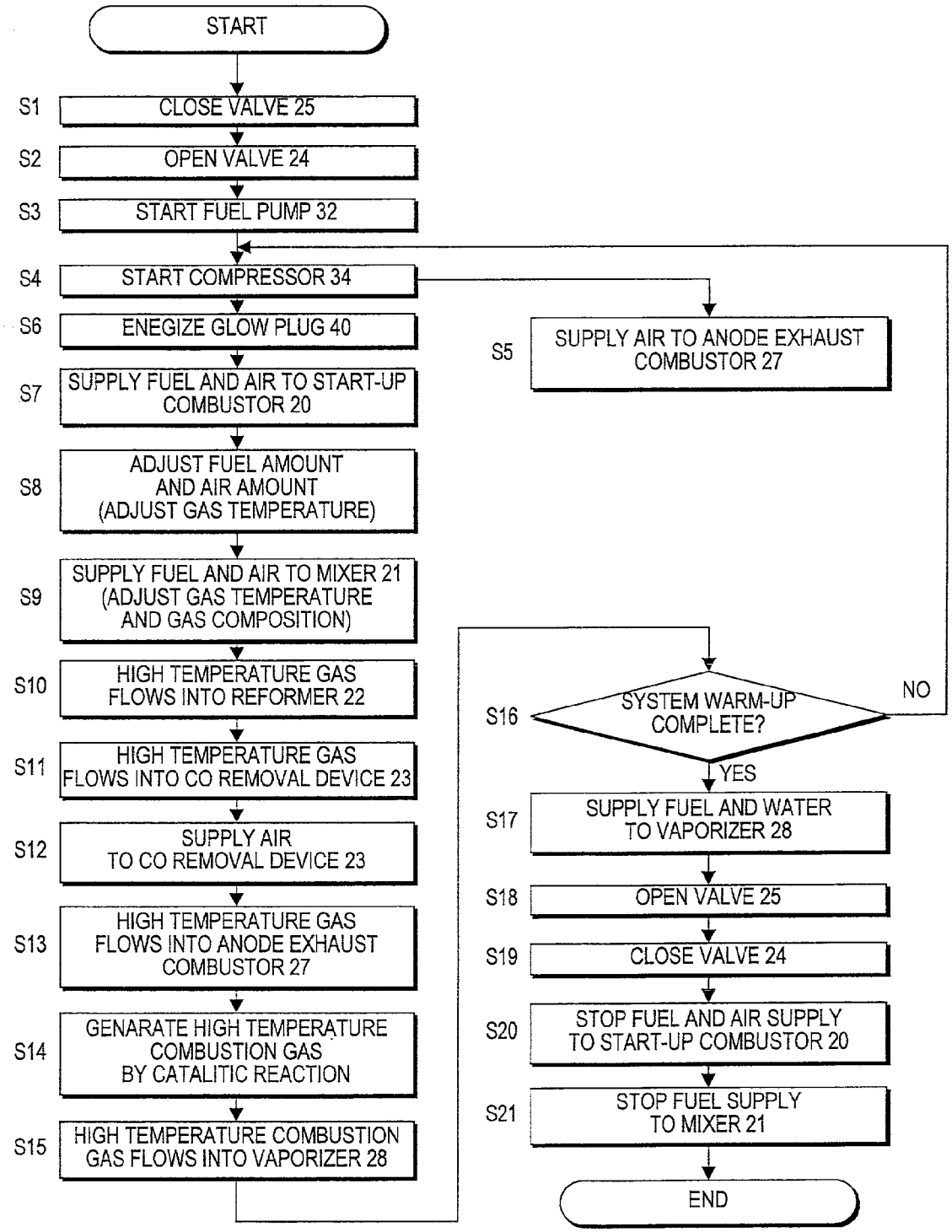
FIG. 4 is a flowchart showing a drive system startup process.

In FIG. 4, firstly in steps S1, S2, the change-over valve 25 is closed, inflow of reformate gas to the fuel cell 26 is shut off, the change-over valve 24 is opened and reformate gas is supplied to the anode exhaust combustor 27.

Next, in a step S3, the fuel pump 32 is started and fuel pressure is adjusted to a predetermined pressure.

In steps S4–S6, the compressor 34 is started, the glow plug 40 in the start-up combustor 20 is energized, and air is supplied to the anode exhaust combustor 27 by the air nozzle 38.

In steps S7 and S8, fuel and air are respectively supplied to the start-up combustor 20 from the fuel injector 29 and air nozzle 35, mixed so that the air-fuel ratio is richer than the stoichiometric air-fuel ratio, and ignited by the glow plug 40 to generate high temperature gas containing fuel for a reforming reaction. At this time, the fuel and air amounts are adjusted based on the temperature detection result of a temperature sensor 50, and the gas temperature is adjusted to a predetermined temperature.

In step S9, after this high temperature gas enters the mixer 21, fuel and air respectively supplied from the second fuel injector 30 and the supply nozzle 36 are mixed, and the fuel is vaporized. The composition of the high temperature gas is adjusted to a composition suitable for the reforming reaction in the reformer 22 by adjusting the amounts of fuel and air supplied to the mixer 21. The gas temperature is also controlled by adjusting the amounts of fuel and air supplied to the mixer 21 based on the temperature detection result of a temperature sensor 51.

In steps S10, S11, the high temperature gas flows into the reformer 22. The high temperature gas heats the reformer 22 by the reforming reaction and flows into the CO removal device 23.

In step S12, S13, the reformate gas is adjusted to a predetermined temperature and composition by air supplied at the inlet to the CO removal device 23 from the air nozzle 37, and is supplied to the CO removal device 23. After the temperature of the CO removal device 23 has been raised by self-generation of heat due to the reaction, the reformate gas enters the anode exhaust combustor 27.

In steps S14, S15, reformate gas is mixed with air in the anode exhaust combustor 27, combustion of reformate gas takes place by a catalytic reaction, and combustion gas at high temperature is sent to the vaporizer 28. Due to this burnt gas, the vaporizer 28 is heated and its temperature rises. The temperature of the burnt gas falls due to heat exchange with the vaporizer 28 and the outlet temperature (detected by a temperature sensor 52) of the vaporizer 28 is initially low, but it increases as the system warms up.

In a step S16, when the value of the temperature sensor 52 exceeds a predetermined value, it is determined that system warm-up is complete, and the routine proceeds to a step S17 and subsequent steps.

In steps S17 to S21, fuel and water are supplied to the vaporizer 28 from the supply valves 31, 33, supply of fuel and air to the start-up combustor 20 is stopped, and supply of fuel to the mixer 21 is also stopped. Simultaneously, the change-over valve 25 is opened and reformate gas is supplied to the fuel cell 26. At this time, the change over valve 24 is closed, and inflow of reformate gas to the anode exhaust combustor 27 is shut off. The processes of the steps S17 to S21 may be performed simultaneously.

Subsequently, fuel vapor vaporized by the vaporizer 28 is supplied to the reformer 22, and the reforming reaction is performed. Heating of the vaporizer 28 takes place due to the catalytic combustion of hydrogen containing anode exhaust and oxygen containing cathode exhaust in the anode exhaust combustor 27, and the normal running state is continued.

Figure 7:
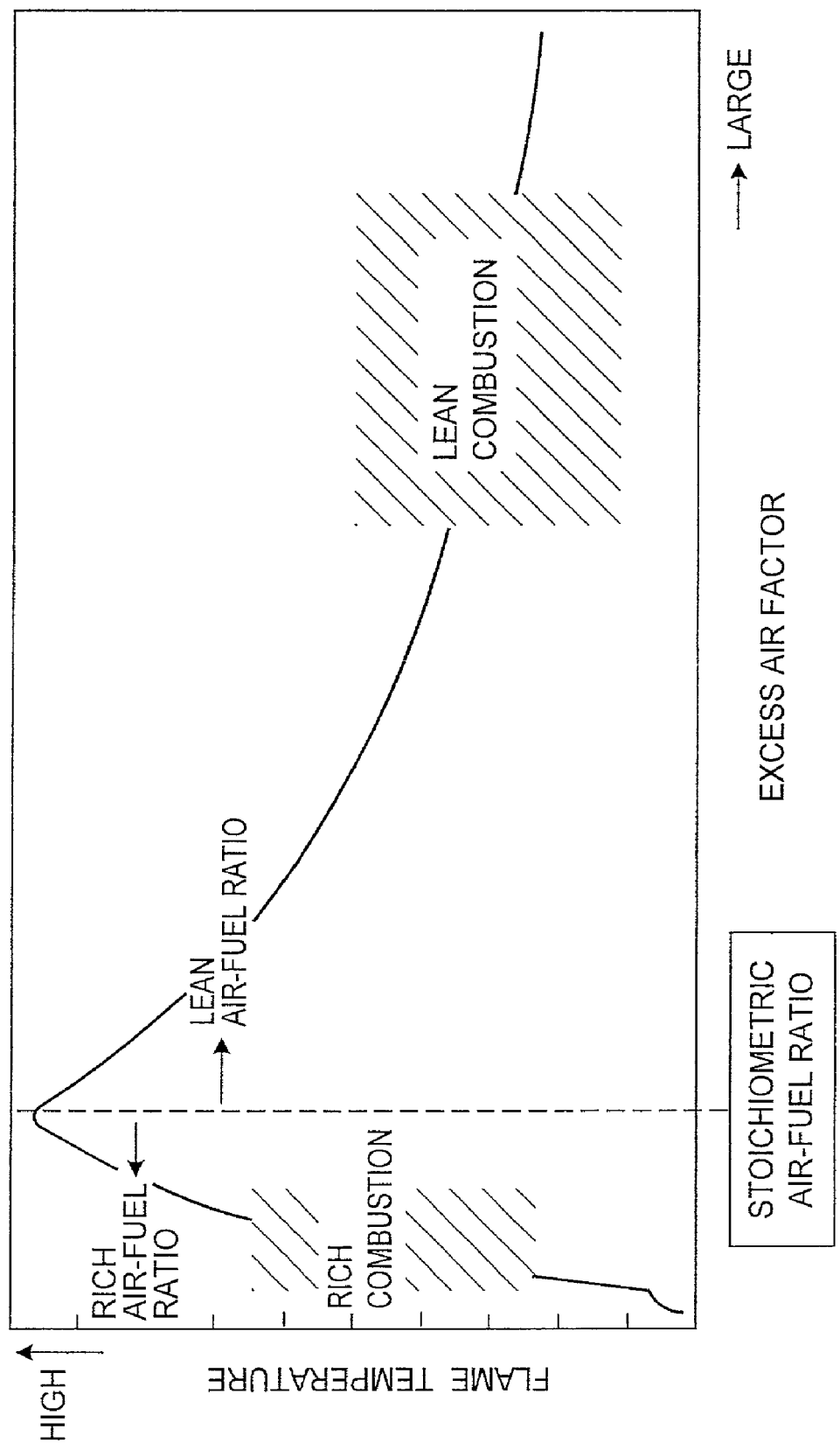
FIG. 7 is a characteristic diagram showing a relation between an excess air factor and flame temperature.

In this embodiment, by making the air-fuel mixture burnt in the startup combustor 20 richer (more concentrated) than the stoichiometric air-fuel ratio of the fuel when the system starts up, the flame temperature (gas temperature) is lowered as shown in FIG. 7, and the production of NOx due to combustion can be prevented.

In the anode exhaust combustor 27, by introducing air from the air nozzle 38, and performing lean combustion on the lean side of the stoichiometric air-fuel ratio, the burnt gas temperature is kept within a predetermined value, overheating of the vaporizer 28 is prevented and combustible gas components are completely burnt, which decreases emissions.

When fuel and air, supplied respectively from the fuel injector 30 and air nozzle 36, are mixed by the mixer 21 with the high temperature gas produced by the start-up combustor 20, and the fuel is vaporized, the gas composition is adjusted to a composition suitable for the reforming reaction in the reformer 22 by adjusting the fuel and air amounts supplied, and in addition, the gas temperature is adjusted substantially to within a predetermined temperature range based on the temperature detection result of the temperature sensor 51, so a stable reforming reaction can be obtained.

Figure 5:
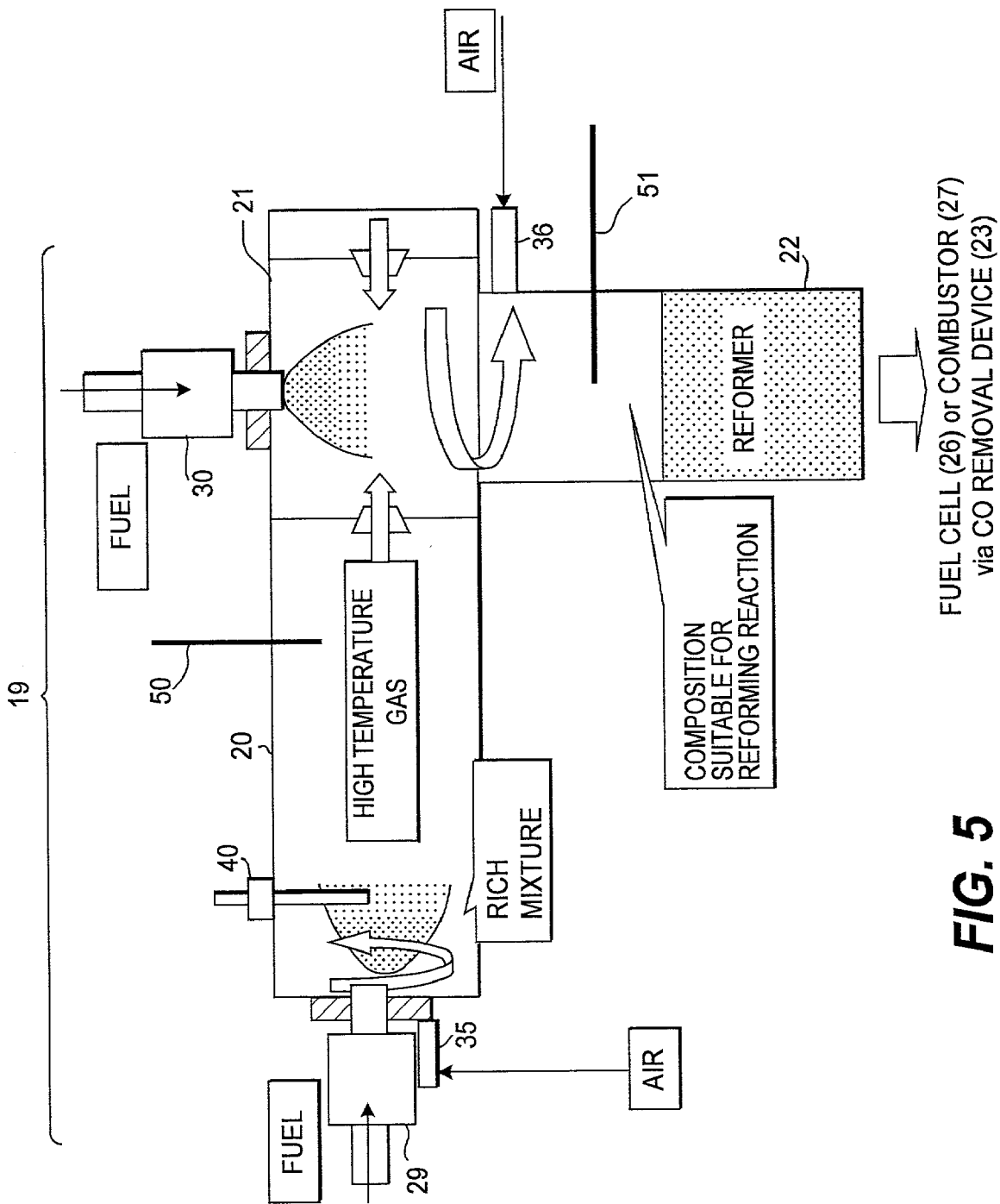
FIG. 5 is a schematic view of the gas supply device according to a second embodiment of this invention.

FIG. 5 shows a second embodiment.

According to this embodiment, the air nozzle 36 is provided downstream of the fuel injector 30. After the high temperature gas produced by the start-up combustor 20 and fuel supplied from the fuel injector 30 are mixed and vaporized, air is supplied from the air nozzle 36. Hence, vaporization of fuel by the high temperature gas is enhanced, and a stable reforming reaction takes place.

Figure 6:
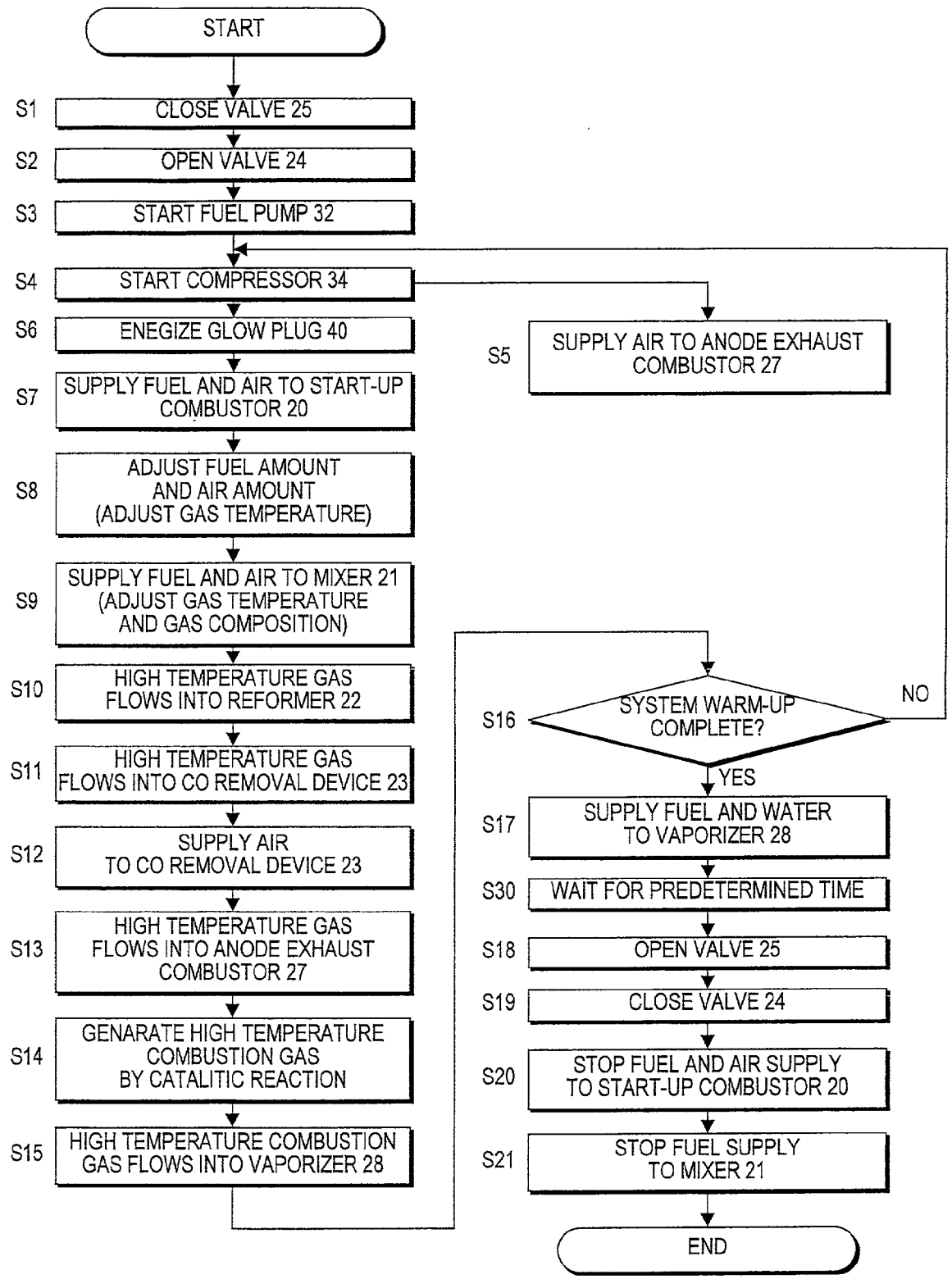
FIG. 6 is a flowchart showing a startup process in the second embodiment.

The startup process of the second embodiment is shown in FIG. 6. Identical symbols are given to identical processes.

A difference from the first embodiment is that, after supply of fuel to the vaporizer 28 is started in the step S17, and a predetermined time is allowed to elapse in a step S30, supply of reformate gas to the fuel cell 26 is started, while the supply of fuel and air to the start-up combustor 20 and supply of fuel to the mixer 21 is stopped. Due to this operation, a smooth transition occurs from startup running to normal running.

FIGS. 8–15 show third to seventh embodiments of this invention. These differ from the preceding embodiments mainly in the construction of the gas supply device (19). Identical symbols are given to common parts in the figures.

Figure 8:
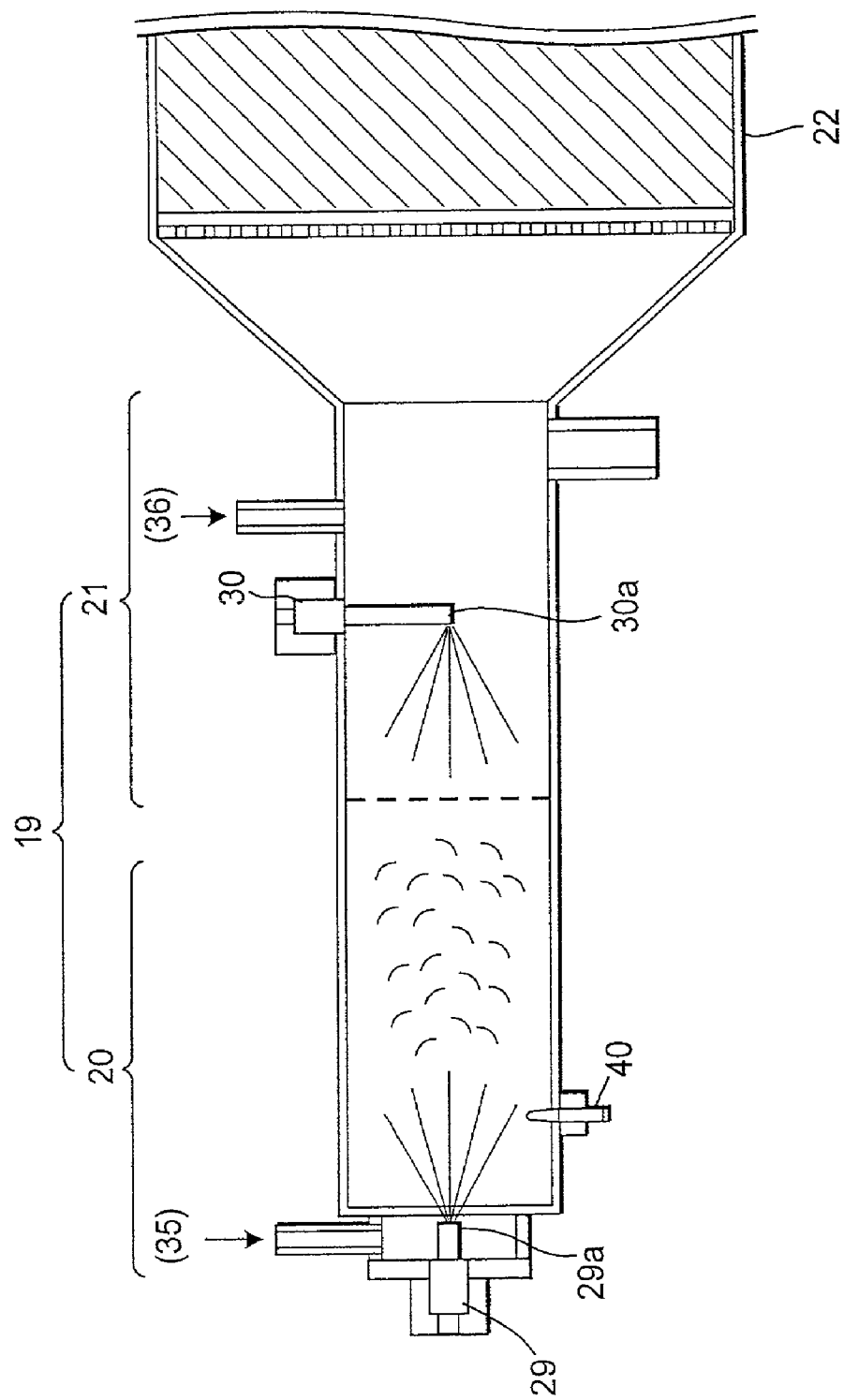
FIG. 8 is a schematic view of the gas supply device according to a third embodiment.

FIG. 8 shows the third embodiment.

The fuel injector 29 for supplying fuel is provided substantially in the center of the upstream end face of the start-up combustor 20, a nozzle 30a of the fuel injector 30 which injects fuel into the mixer 21, extends inside from a side face of the mixer 21 formed in one piece with the start-up combustor 20 and reformer 22, and the nozzle injection port of the injector 30 is provided opposite a nozzle 29a of the fuel injector 29 substantially in the center of the mixer 21.

In this way, fuel for adjusting the gas composition is injected from the fuel injector 30 evenly into the high temperature gas from the start-up combustor 20, and a uniform gas composition is obtained.

Figure 9:
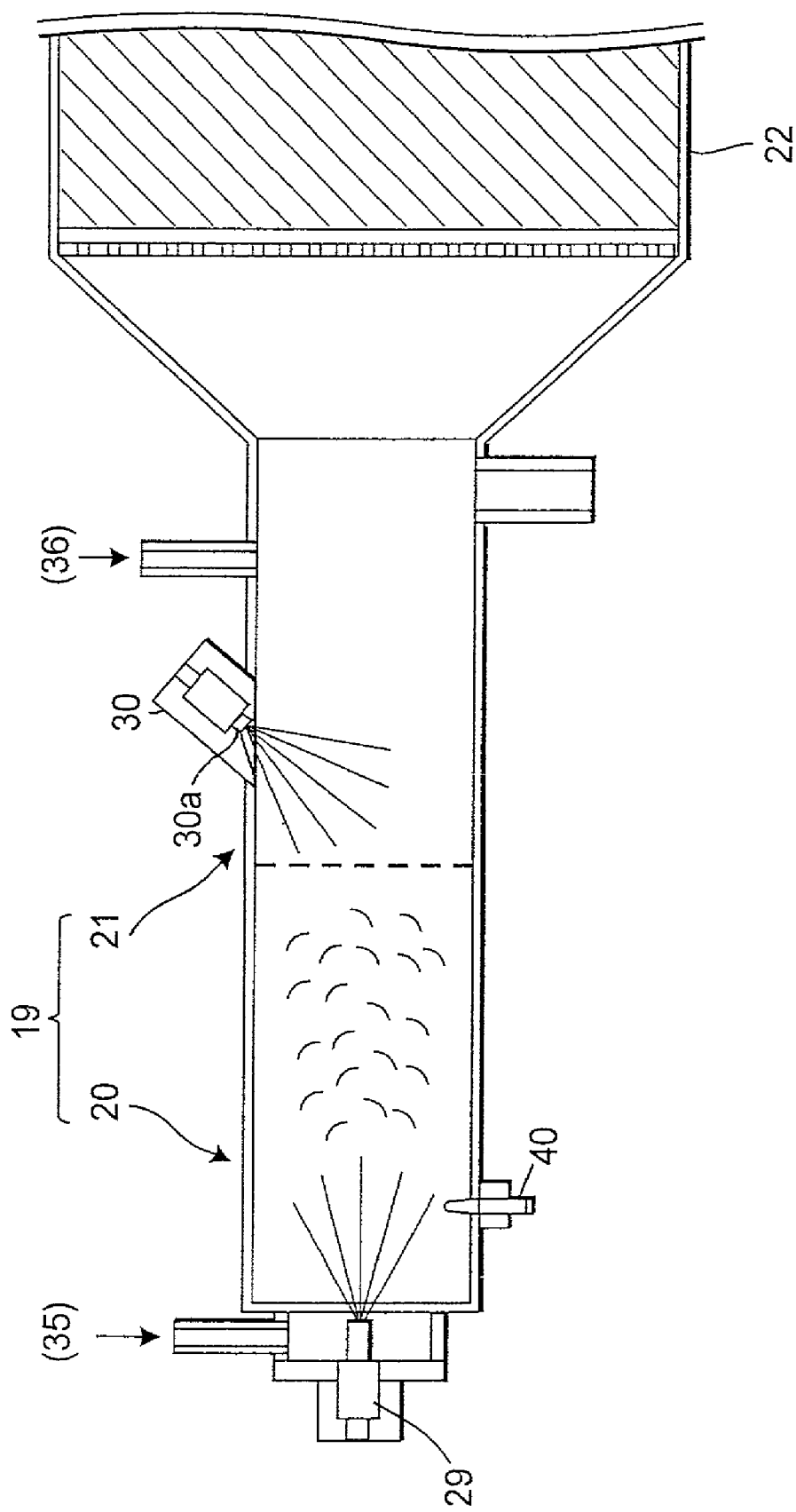
FIG. 9 is similar to FIG. 8, but showing a fourth embodiment of this invention.

FIG. 9 shows a fourth embodiment.

The fuel injector 30 for adjusting the gas composition is provided at a predetermined angle on the side face of the mixer 21 so that its nozzle 30a does not extend inside the mixer 21. The injection port of the nozzle 30a opens onto the side face of the mixer 21.

In this way, the surface area of the fuel injector 30 exposed to high temperature combustion gas is decreased, and the heat strength of the fuel injector 30 can be set relatively low.

Figure 10:
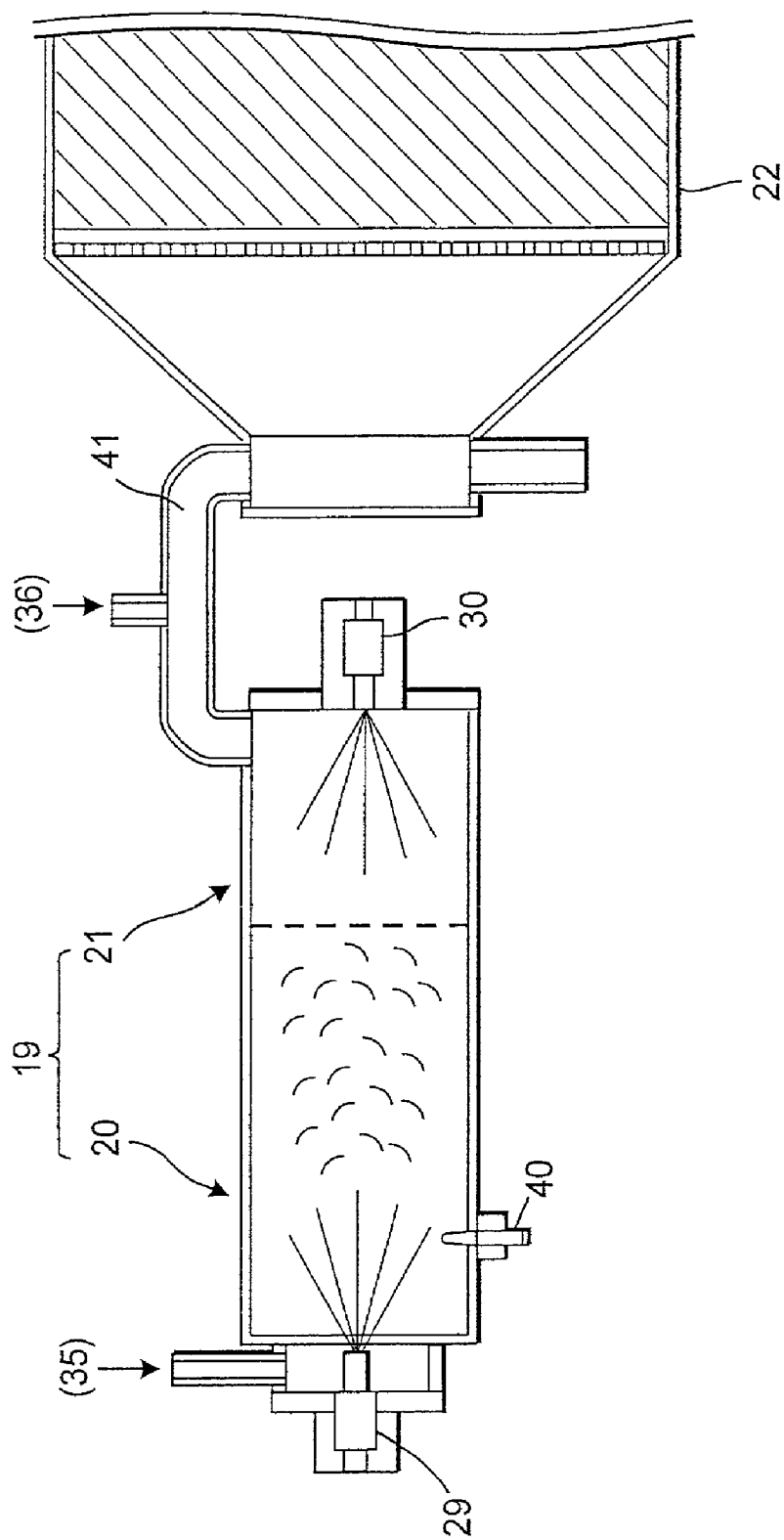
FIG. 10 is similar to FIG. 8, but showing a fifth embodiment of this invention.

In a fifth embodiment shown in FIG. 10, the mixer 21 and reformer 22 are not formed in one piece as in the preceding embodiments but are formed separately, and a high temperature gas passage 41 is formed from the side face of the mixer 21 to the reformer 22. The air nozzle 36 supplies air to the high temperature gas passage 41. The fuel injector 30 for adjusting gas composition is disposed on a downstream end face of the mixer 21 so that it is facing the fuel injector 29, and fuel for adjusting the gas composition is injected substantially from the center of the downstream end face of the mixer 21.

As a result, a special nozzle construction or angle setting for the fuel injector 30 is unnecessary, so a conventional injection valve may be used, and a uniform gas composition can be obtained. Further, the fuel injector 30 comes in contact only with relatively low temperature gas after the methanol is vaporized, so its heat strength can be set low.

Figure 11:
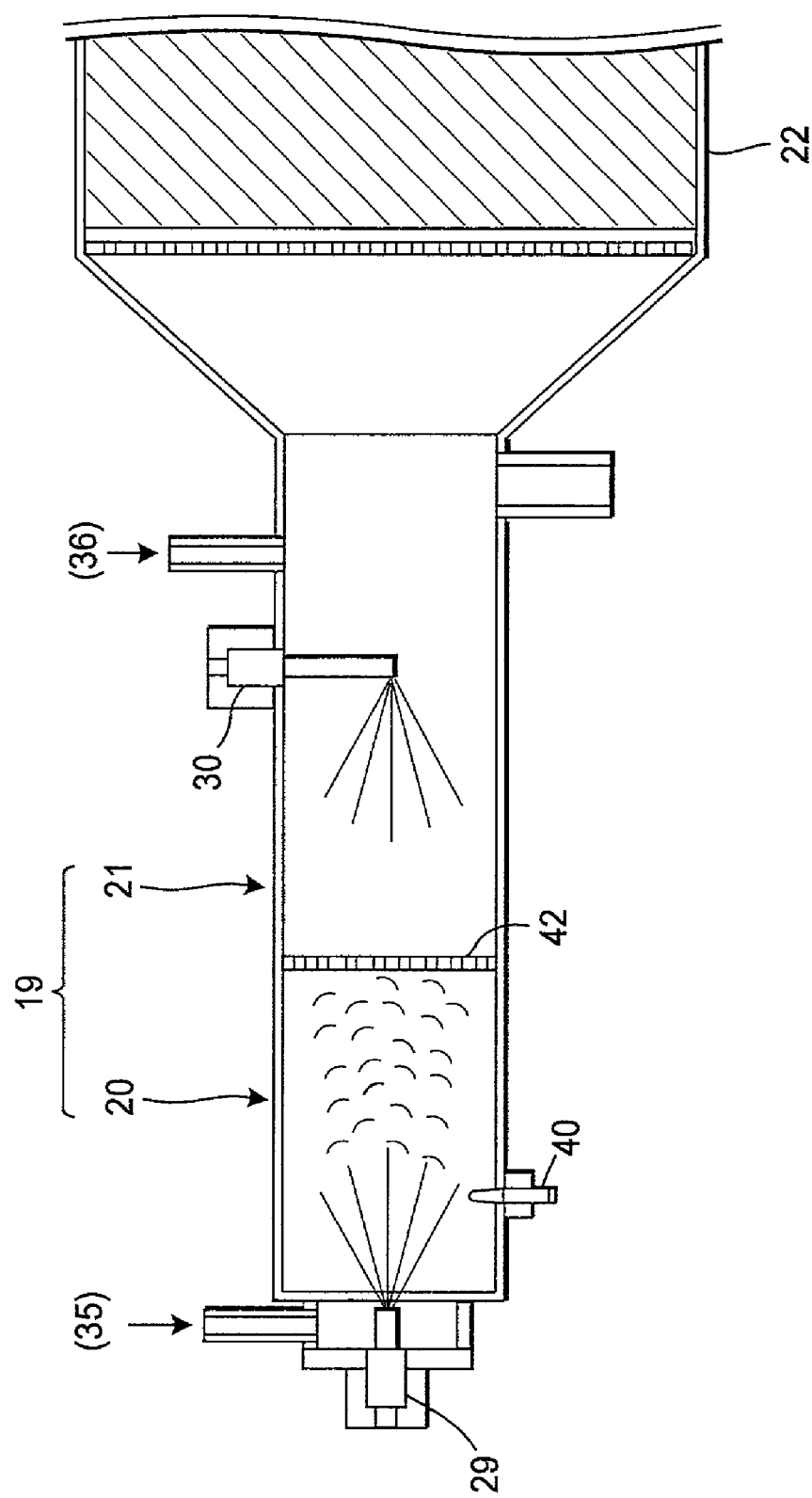
FIG. 11 is similar to FIG. 8, but showing a sixth embodiment of this invention.
Figure 12:
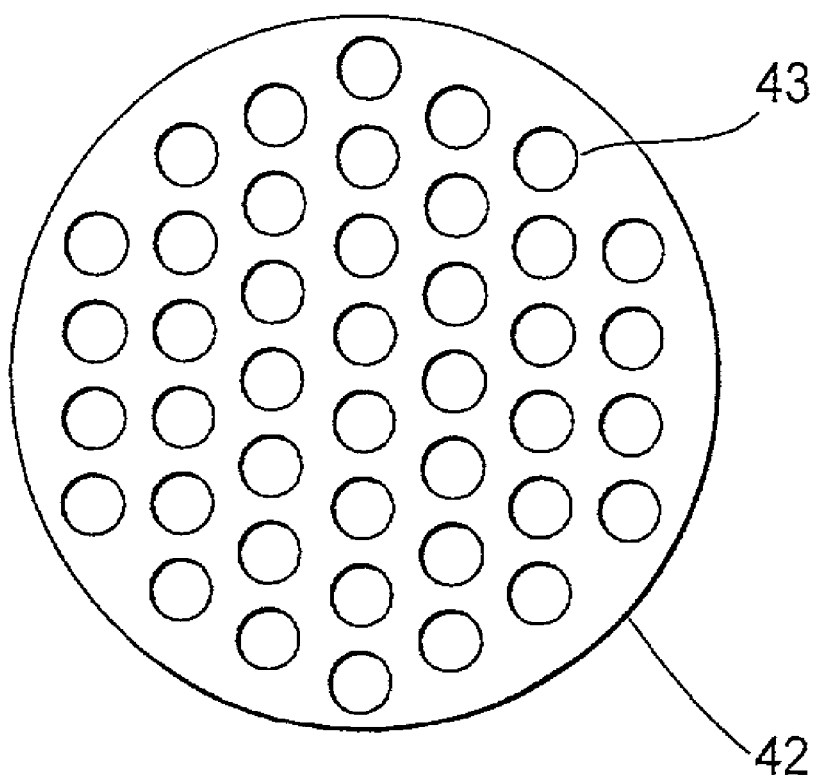
FIG. 12 is a front view of a vaporization plate used in the sixth embodiment.

In a sixth embodiment shown in FIG. 11, a vaporizing plate 42 comprising plural holes 43 of small diameter is provided upstream of the second fuel injector 30, as shown in FIG. 12. By providing this vaporizing plate 42, fuel injected by the fuel injector 30 which was not vaporized, is captured, and fuel not yet vaporized, is vaporized by heat exchange with the high temperature gas from the start-up combustor 20. Instead of the vaporizing plate 42, a mesh or grid may be provided upstream of the fuel injector 30.

Figure 13:
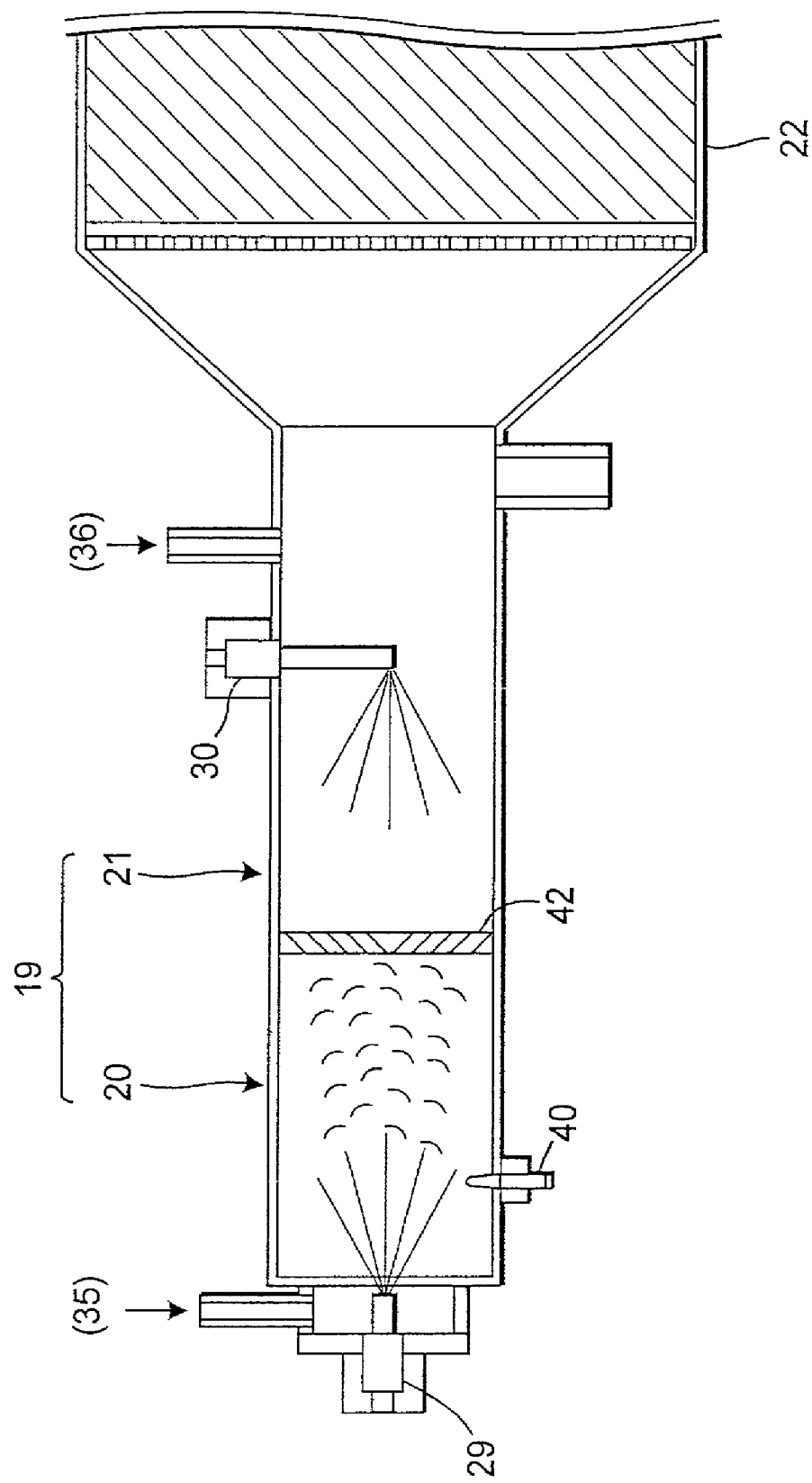
FIG. 13 is similar to FIG. 8, but showing a seventh embodiment of this invention.

In a seventh embodiment shown in FIG. 13, the vaporizing plate 42 comprising a combination of plural annular plates is provided upstream of the fuel injector 30.

Figure 14:
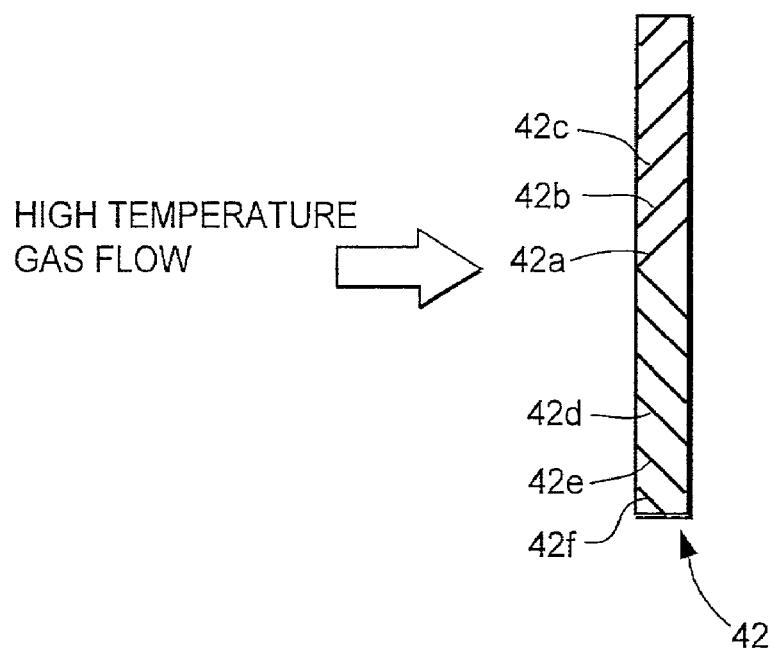
FIG. 14 is a cross-sectional view of a vaporization plate used in the seventh embodiment.
Figure 15:
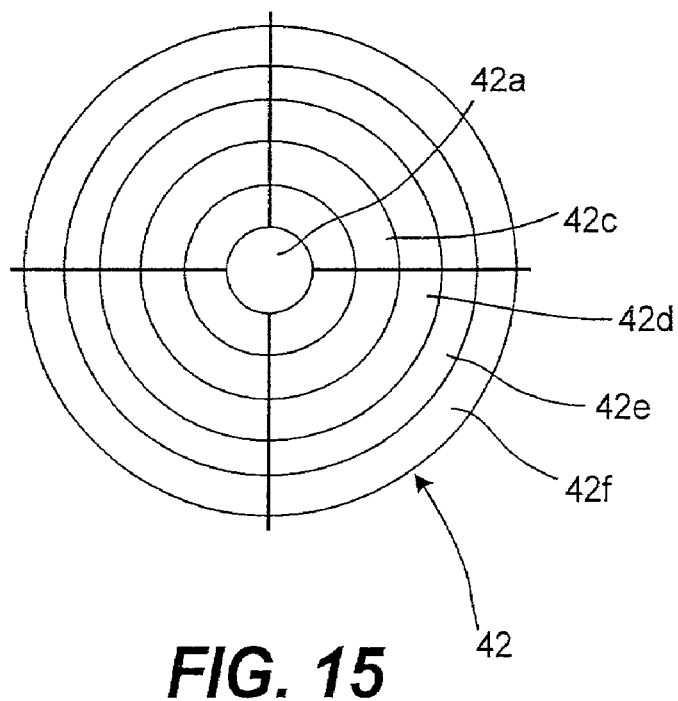
FIG. 15 is a front view of the vaporization plate used in the seventh embodiment.

As shown in FIG. 14, FIG. 15, the vaporizing plate 42 comprises annular plates 42a–42f which have a large diameter in the downstream direction of the high temperature gas flow. Specifically, the diameter of the transverse cross section of the annular plates increases further downstream. The plate 42a is conical, and the plates 42b–42f are shaped like a dish without a base.

The plates 42a–42f are coaxially disposed, the downstream diameter of one plate being larger than the upstream diameter of another plate which is externally adjacent to it, and the upstream side of the innermost plate 42a is closed.

By providing this vaporizing plate 42, the flow of high temperature gas from the start-up combustor 20 to the mixer 21 is smoothed, fuel injected via the fuel injector which has not yet been vaporized is captured by the vaporizing plate 42, and its vaporization is promoted.

Figure 16:
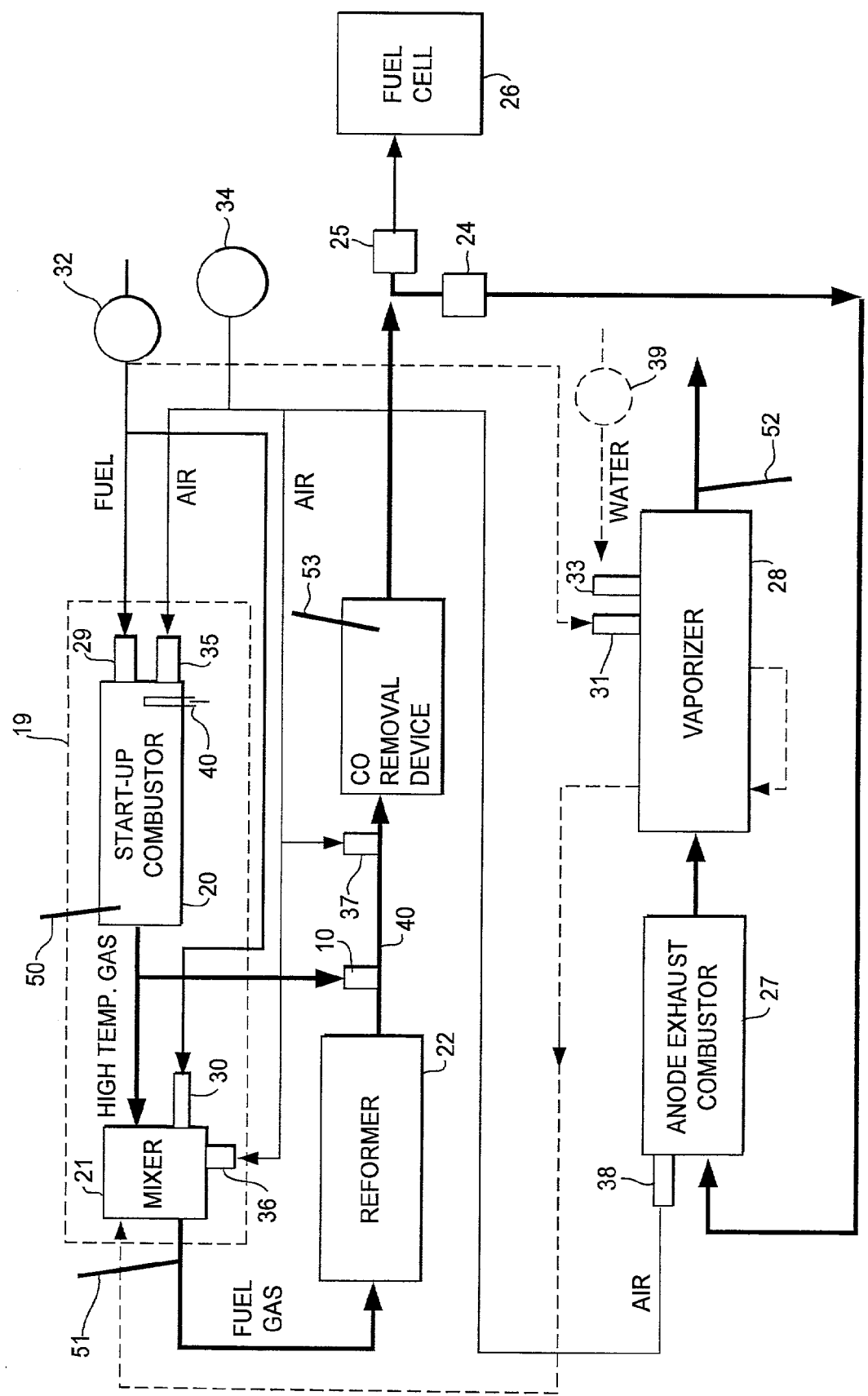
FIG. 16 is similar to FIG. 1, but showing an eighth embodiment of this invention.

FIG. 16 shows an eighth embodiment.

A combustion gas supply valve 10 which directly takes in combustion gas from the start-up combustor 20 is provided in a reformate gas passage 40 connecting the reformer 22 and the CO removal device 23. A temperature sensor 53 which detects the temperature of the CO removal catalyst is provided in the CO removal device 23.

In this embodiment, when the system starts up, the high temperature gas containing fuel for the reforming reaction is supplied to the reformer 22, the combustion gas supply valve 10 is operated so that reformate gas from the reformer 22 and air from the air nozzle 37 are mixed with the combustion gas from the start-up combustor 20, and the mixed gas flows into the CO removal device 23. The mixed gas is at high temperature, and contains a large amount of oxygen.

Due to this control, when the system starts up, the CO removal catalyst in the CO removal device 23 heats up directly due to the heat of the mixed gas. The oxygen in the mixed gas oxidizes combustible components such as hydrogen and carbon monoxide in the reformate gas, and the catalyst is heated due to the heat of oxidation generated at this time. Immediately after the system starts up, the activation degree of the oxidation catalyst of the reformer 22 is low, so the concentration of combustible components such as hydrogen and CO contained in the reformate gas is also low. However, as the activation of the catalyst in the reformer 22 proceeds, the concentration of combustible components in the reformate gas also increases.

Consequently, the heat of oxidation increases very rapidly, and the temperature of the CO removal catalyst in the CO removal device 23 rapidly rises to the predetermined temperature range in which CO can be oxidized. The supply of the high temperature gas to the CO removal device 23 from the start-up combustor 20 is continued until the temperature of the CO removal catalyst in the CO removal device 23 reaches a predetermined temperature.

Therefore, in this embodiment, the warm-up of the CO removal device 23 is also assisted as well as the warm-up of the reformer 22, and the system startup time can be further decreased.

The entire contents of Japanese Patent Applications P2000-276342 (filed Sep. 12, 2000) and P2000-343569 (filed Nov. 10, 2000) are incorporated herein by reference.

Although the invention has been described above by reference to a certain embodiment of the invention, the invention is not limited to the embodiment described above. Modifications and variations of the embodiments described above will occur to those skilled in the art, in light of the above teachings. The scope of the invention is defined with reference to the following claims.

INDUSTRIAL FIELD OF THE INVENTION

This invention is useful for obtaining a stable reformate gas composition in a fuel cell drive system when the system starts up, and improving its performance. Further, it is useful also for decreasing system startup time, and reducing the NOx discharge amount.

The invention claimed is:

1. A method for operating a drive system for a fuel cell, comprising:

generating reformate gas containing hydrogen by reforming a fuel gas with a reformer;
supplying the reformate gas to the fuel cell;
supplying a mixture of the fuel gas and air to the reformer from a gas supply device provided upstream of the reformer when the system is in a normal running state;
generating a high temperature gas containing a fuel component for a reforming reaction with the gas supply device; and
supplying the high temperature gas containing the fuel component for the reforming reaction to the reformer continuously until warm-up of the system completes when the system starts up,
wherein the drive system is configured to operate in accordance with the method and comprises:
a first fuel supply mechanism which supplies fuel to the gas supply device;
a second fuel supply mechanism which supplies fuel at downstream of the first fuel supply mechanism; and
a first air supply mechanism which supplies air at downstream of the first fuel supply mechanism,
wherein the gas supply device generates the high temperature gas containing the fuel component for the reforming reaction by mixing the high temperature gas generated by burning the fuel supplied from the first fuel supply mechanism with fuel supplied from the second fuel supply mechanism and air supplied from the first air supply mechanism,
the first air supply mechanism supplies air at downstream of the second fuel supply mechanism, and
the second fuel supply mechanism injects fuel opposite the flow of the high temperature gas generated by burning the fuel supplied from the first fuel supply mechanism.

2. The method as defined in claim 1, wherein:
the second fuel supply mechanism is provided on a downstream end face of a mixing part to supply fuel against the flow of the high temperature gas.

3. A method for operating a drive system for a fuel cell, comprising:
generating reformate gas containing hydrogen by reforming a fuel gas with a reformer;
supplying the reformate gas to the fuel cell;
supplying a mixture of the fuel gas and air to the reformer from a gas supply device provided upstream of the reformer when the system is in a normal running state;
generating a high temperature gas containing a fuel component for a reforming reaction with the gas supply device; and
supplying the high temperature gas containing the fuel component for the reforming reaction to the reformer continuously until warm-up of the system completes when the system starts up,
wherein the drive system is configured to operate in accordance with the method and comprises:
a first fuel supply mechanism which supplies fuel to the gas supply device;
a second fuel supply mechanism which supplies fuel at downstream of the first fuel supply mechanism; and
a first air supply mechanism which supplies air at downstream of the first fuel supply mechanism,
wherein the gas supply device generates the high temperature gas containing the fuel component for the reforming reaction by mixing the high temperature gas generated by burning the fuel supplied from the first fuel supply mechanism with fuel supplied from the second fuel supply mechanism and air supplied from the first air supply mechanism,
the first air supply mechanism supplies air at downstream of the second fuel supply mechanism, and
a vaporizing plates which catches and vaporizes fuel supplied from the second fuel supply mechanism, is provided upstream of the second fuel supply mechanism.

4. The method as defined in claim 3, wherein; the vaporizing plate has a plurality of holes.

5. The method as defined in claim 3, wherein: the vaporizing plate comprises plural annular plates which are coaxially disposed.

6. The method as defined in claim 5, wherein:
the diameter of the cross-section of one annular plate increases further downstream, and the downstream diameter of the one annular plate is larger than the upstream diameter of another annular plate which is externally adjacent to the one annular plate.

7. A method for operating a drive system for a fuel cell, comprising:
generating reformate gas containing hydrogen by reforming a fuel gas with a reformer;
supplying the reformate gas to the fuel cell;
supplying a mixture of the fuel gas and air to the reformer from a gas supply device provided upstream of the reformer when the system is in a normal running state;
generating a high temperature gas containing a fuel component for a reformina reaction with the gas supply device; and
supplying the high temperature gas containing the fuel component for the reforming reaction to the reformer continuously until warm-up of the system completes when the system starts up;
wherein the drive system is configured to operate in accordance with the method and comprises:
a CO removal device which removes carbon monoxide in the reformate gas generated by the reformer; and
a bypass line which directly supplies the high temperature gas generated in the gas supply device to the CO removal device, wherein;
the high temperature gas generated in the gas supply device is also supplied to the CO removal device when the system starts up.

8. The method as defined in claim 7, wherein:
the reformate gas generated by the reformer and air from a the second air supply mechanism are supplied to the CO removal device when the system starts up.

9. The method as defined in claim 7, wherein: the high temperature gas generated in the gas supply device is supplied to the CO removal device until the temperature of a CO removal catalyst in the CO removal device reaches a predetermined temperature.

* * * * *